United States Patent [19]
Prader

[11] 3,756,075

[45] Sept. 4, 1973

[54] APPARATUS FOR MEASURING TAPE TENSION

[75] Inventor: James E. Prader, Roselle, Ill.

[73] Assignee: Ampex Corporation, Redwood City, Calif.

[22] Filed: Sept. 28, 1971

[21] Appl. No.: 184,344

[52] U.S. Cl. .................................................. 73/144
[51] Int. Cl. ............................................... G01l 5/10
[58] Field of Search ............................... 73/143, 144

[56] References Cited

UNITED STATES PATENTS 3,204,454 9/1965 Friman et al. ........................ 73/143

*Primary Examiner*—Jerry W. Myracle
*Attorney*—William E. Anderson, Robert G. Clay et al.

[57] ABSTRACT

The force required to unwind an endless magnetic tape from a coil of tape carried on a rotatable spool such as used in a magnetic tape cartridge is measured quickly and accurately while tape is being transported. The apparatus comprises a capstan for cooperation with a pinch member, such as a pinch roller in the cartridge, and a biasing means, such as a spring acting on the cartridge, of a predetermined force to establish the feed couple for transporting the tape at conventional transport speed. A force measuring transducer engages the running tape and measures the tension in the tape which is indicated on means such as a meter.

9 Claims, 5 Drawing Figures

Patented Sept. 4, 1973 3,756,075

4 Sheets-Sheet 1

Patented Sept. 4, 1973

3,756,075

4 Sheets-Sheet 4

APPARATUS FOR MEASURING TAPE TENSION

This invention relates to apparatus application for measuring the force required to pull a magnetic tape outwardly from an inner convolution of a coil of magnetic tape and to return the tape to an outer convolution of the coil which is carried on a rotatable spool used in a magnetic tape cartridge.

In cartridges of this general kind, four or eight track magnetic tapes of approximately one quarter inch in width and as much as 400 feet in length are wound in a coil. The tape is endless with each convolution moving inwardly across a rotatable spool toward the center of the coil and then upwardly and outwardly from the coil. During a playback or recording operation, the tape travels from the center of the coil to a guide post in the cartridge and across an opening in a front wall of the cartridge, which admits entry of a transducer head, and past a pinch roller mounted in the cartridge for return to the outer convolution of the coil. A capstan of the playback or recording apparatus projects into another opening in the front wall of the cartridge housing to cooperate with the pinch roller in the cartridge to transport the tape during a playback or recording operation.

Good playback or recording performance from such endless magnetic tapes is adversely effected by tapes which are too tightly wound or too loosely wound; and specifications have been developed to assure that force required to unwind the tape is within acceptable limits for good performance. Usually, the force needed to unwind the tape is very low, e.g. one or two ounces of force. For instance, one specification for tapes of this kind is one ounce of force with a tolerance of plus or minus one half ounce. For longer tapes and heavier coils of tape, the tension specification may be larger, for example, 2 ounces with a similar tolerance range.

Heretofore, the pullout force or tension for tapes for such tape cartridges has been tested statically by hanging the cartridge from a loop of tape and measuring the length of the tape loop pulled from the cartridge due to its own weight being suspended. Where the cartridge was too loosely wound, the length of the tape loop would be long and where the cartridge was tightly wound, the loop of tape would be very short. While such static tests provide an indication of the tightness or the looseness with which the tape was wound by the winder, such tests do not provide a close approximation of the pullout force actually encountered while the tape is being transported at operational speed during a playback or recording operation. Thus, a need exists for a device for checking the pullout tension of a tape of such a tape cartridge.

Tape cartridges, as described above, are produced in the millions annually and hence it is important that the checking of the dynamic pullout force be accomplished quickly and with a minimum of expense. It has been found by selectively testing the cartridges after they have been wound on the spool and/or after coiled tapes and spools have been inserted into the cartridge housing that it is possible to detect tension problems arising because of some difficulty with parts of the cartridge or some difficulty with the tape winder before a large number of defective or lesser quality cartridges have been manufactured and assembled.

Accordingly, an object of the present invention is to provide a new and improved device for measuring the pull-out tension of an endless magnetic tape for a tape cartridge.

Other objects and advantages of the invention will become apparent from the following detailed description taken in connection with the drawings in which.

Figure 1:
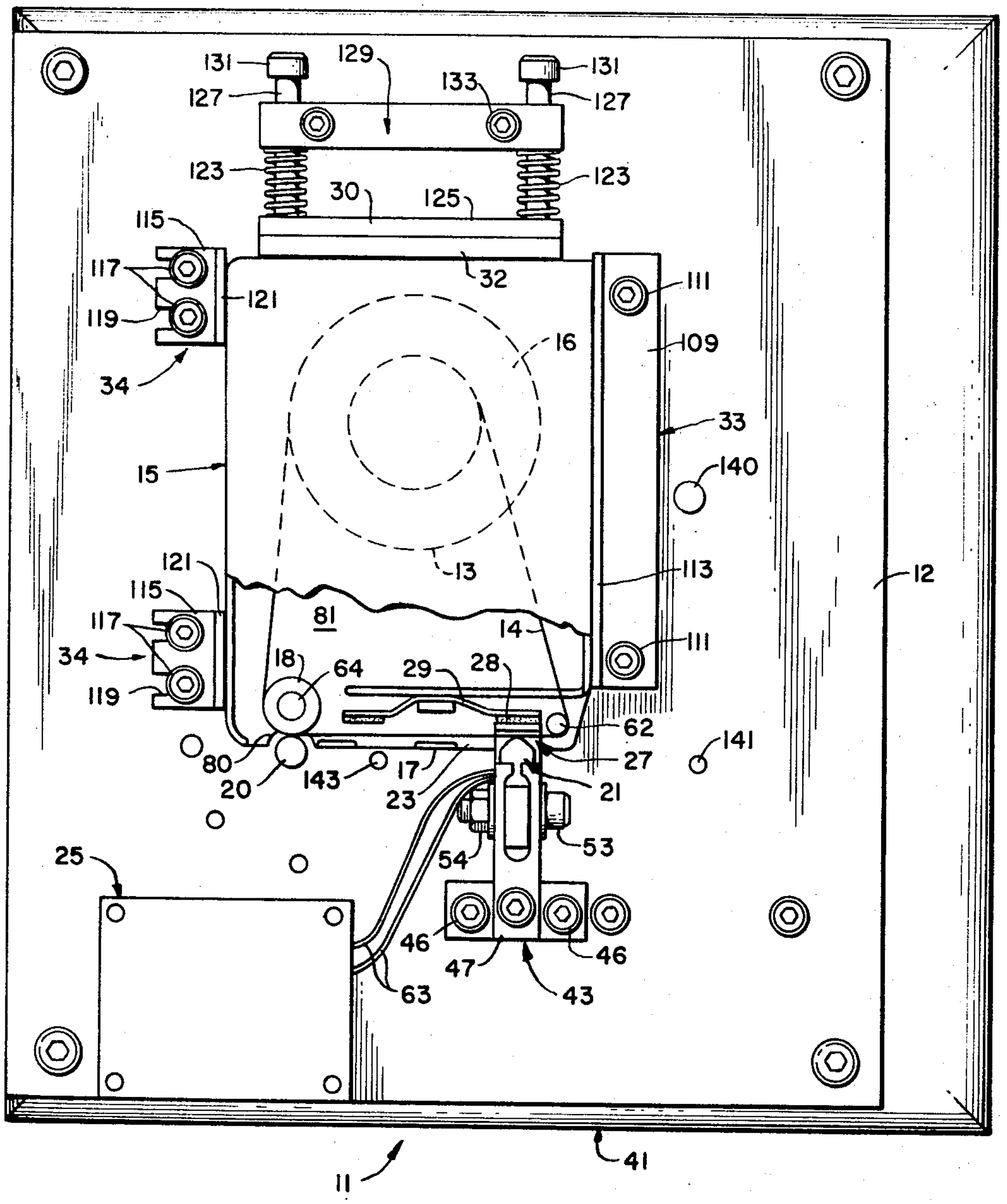
FIG. 1 is a plan view of an apparatus for checking the tape tension of an endless magnetic tape in a tape cartridge and embodying the novel features of the invention.

As shown in the drawings for the purposes of illustration, the invention is embodied in an apparatus 11 having a support means in the form of a plate 12 to receive a spool or platform 13 on which an endless magnetic tape 14 is wound into a coil 16. In the embodiment of the invention illustrated in FIG. 1, the tape supporting spool 13 is mounted for rotation in a conventional cartridge 15 whereas in the embodiment of the invention shown in FIG. 5, the spool is supported directly on the plate 12. During a playback or recording operation, the magnetic tape in the cartridge will be pulled from the inner convolution for travel past a front wall 17 of the cartridge and a sound transducer head (not shown) by a feed couple established between a pinch member 18 in the cartridge and a capstan such as the capstan 20 shown in FIG. 1. If the tape is wound too tightly, the pull exerted on the tape will be high and require excessive tension which may adversely effect the transport speed, quality of sound reproduction or the life of the tape. A too loose winding of the tape may also effect the tape transport speed, quality of sound reproduction, and the ability of the tape to rewind without snarling.

Figure 4:
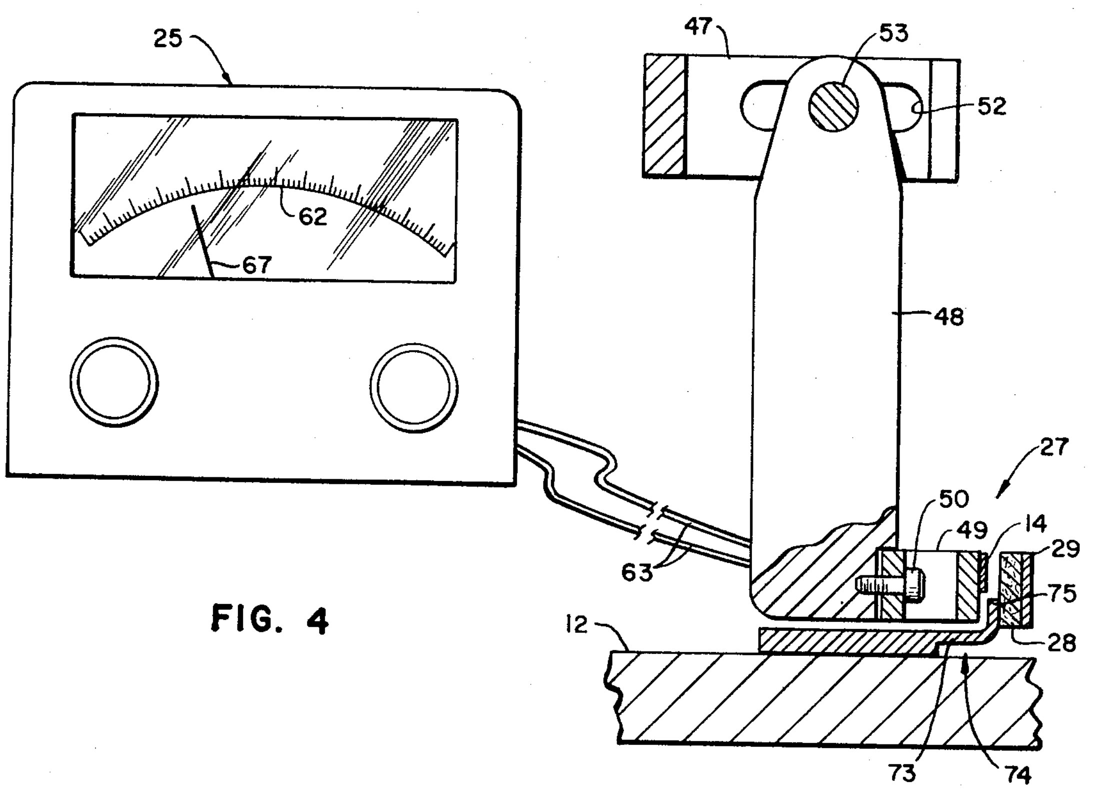
FIG. 4 is an enlarged cross-sectional view of a tension measuring transducer head mounted on a beam.

In accordance with the present invention, the tension in tape occurring during unwinding and winding from the coil 16 is measured while the tape 14 is actually traveling along a path and being transported in a manner similar to that encountered in an actual playback or recording apparatus. This is achieved in the embodiment illustrated in FIG. 1 by holding the cartridge 15 in position with the conventional three pounds of force exerted between the pinch member 18 and the rotatable driving capstan 20 and by driving the capstan to transport the tape at the conventional speed while a force measuring transducer means 21 projects into an opening 23 in the cartridge to engage the tape 14 to measure the tension therein. The illustrated transducer means is an electro-mechanical transducer which is deflected in accordance with the degree of tension in the tape and provides an electrical signal which is fed to an indicating means such as a meter 25, as best seen in FIG. 4, having a scale 26 showing the ounces and tenths of ounces of tension being measured as the tape is transported. Additionally, a pad deflector means 27 projects through the cartridge opening 23 to deflect an internal pressure pad 28 carried on a spring 29 in the cartridge. The pressure pad is used in actual operation of the cartridge to hold the tape against the sound transducer head of the playback or recording mechanism (not shown). By deflecting the pad 28 and the spring 29, the force transducer means will measure tape tension only and not the spring force exerted by the spring 29.

The meter 25 provides a quick visual measurement of the running tension to a relatively unskilled operator and the apparatus may be quickly loaded and unloaded with a cartridge at a relatively low cost. More particularly, the cartridge may be readily installed by inserting the front end thereof between the side guides 33 and 34 and then sliding the cartridge forwardly along the support 12 until the rear end of the cartridge abuts an inclined cam surface 32 of a spring urged block 30 and cams the block 30 rearwardly until the rearward end of the cartridge is flat on the support 12. The spring urged block 30 thus forces the cartridge forwardly towards the capstan 20 which also serves as a stop means in that it limits forward movement of the cartridge when abutted by the tape 14 at the pinch member 18. After reading the meter 25, the operator need merely lift the cartridge from between the side guides 33 and 34. Thus, it will be seen that a running tension check may be made quickly and inexpensively on an endless tape in a cartridge with the apparatus 11 of the present invention.

Figure 2:
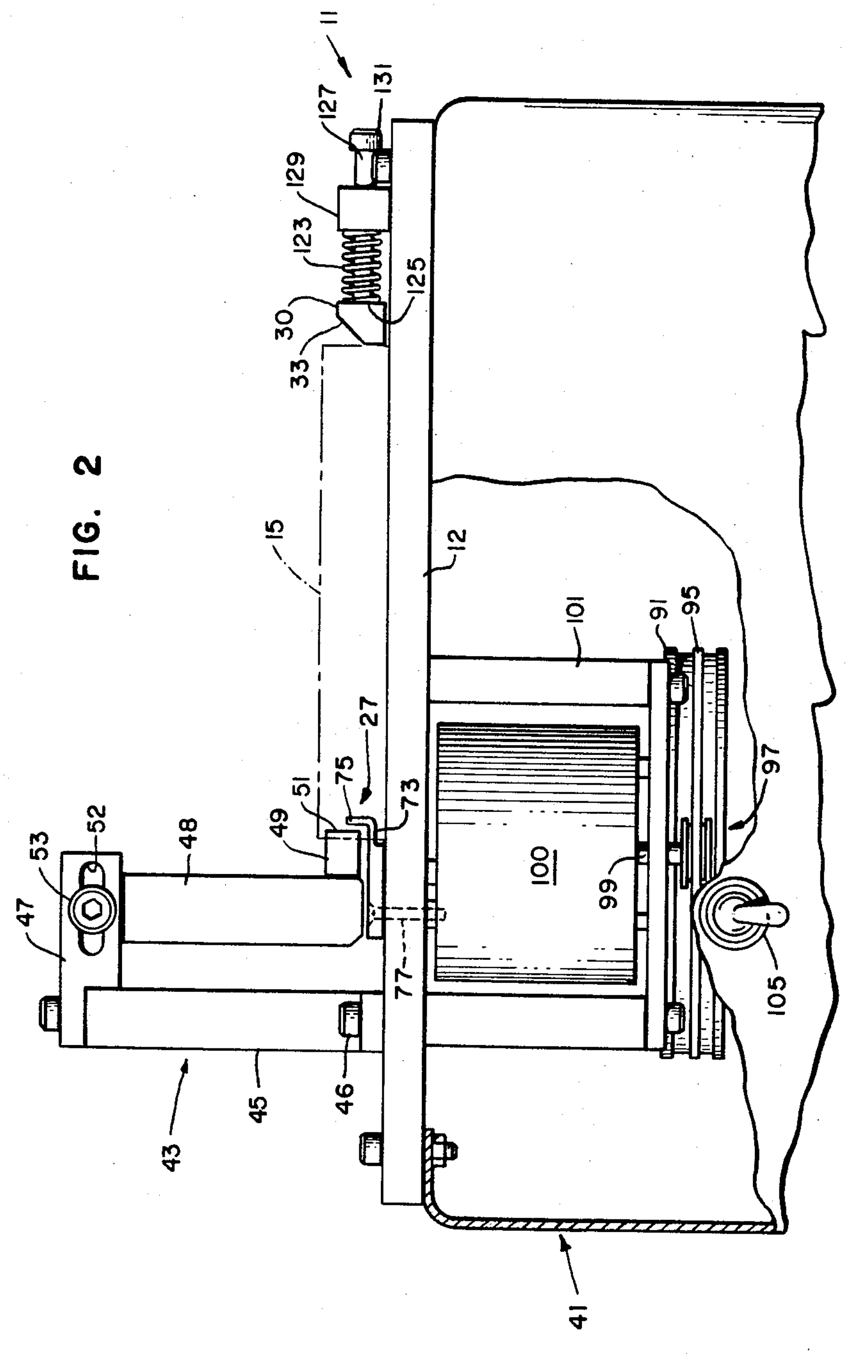
FIG. 2 is a side elevational view, partially broken away, of the apparatus of FIG. 1.

Referring now in greater detail to the embodiment of the invention illustrated in FIGS. 1–4, the support 12 is preferably in the form of a large flat horizontally disposed plate, as best seen in FIG. 2, which is mounted on upstanding frame 41 to be located at a convenient height for the manual manuipulation of the cartridges to and from the tension measuring apparatus 11. Secured to the upper side of the support 12 is an upstanding bracket 43 for holding the force measuring transducer means 21 at the proper position relative to the cartridge 15. To this end, the support bracket 43 includes an upstanding bar 45 (FIG. 2) fastened at its lower end by screws 46 to the support 12 and further includes, at its upper end, a generally horizontally disposed support arm 47 from which depends a transducer carrying beam 48. The force measuring transducer means 21 has a housing 49 fastened to the lower end of the beam by screws 50 (FIG. 4) at a predetermined height above the top surface of the support 12 on which the cartridge rests and has a sensing bar or tip 51 to engage the tape 14.

To facilitate the proper positioning of the transducer means 21, the depending support beam 48 carrying the transducer means is adjustably mounted on the support arm 47 by a pin and slot arrangement. More specifically and as best seen in FIGS. 2 and 4, an elongated horiziontally disposed slot 52 is formed in the horizontally disposed support arm 47 and a screw 53 is extended through the elongated slot and through an opening in the beam 48 to receive a nut 54 (FIG. 1) which clamps the beam 48 at a predetermined position relative to capstan 20 and side guides 33 and 34 and hence relative to the cartridge 15 positioned by them.

The tape 14 travels within the cartridge 15 along a path substantially parallel to the front catridge wall 17 and, as seen in FIG. 1, between a post 62 in the cartridge and the rotatable pinch roller 18 mounted on a post 64 in the cartridge. The rounded tip 51 of the transducer means engages the tape 14 and is deflected in a forward direction from the cartridge 15. The illustrated transducer means comprises a conventional transducer having an internal spring (not shown) for causing a parallelogram mechanism therein to shift a linear variable displacement transformer which in turn provides an output signal over lines 63 to the read-out indicating means 25 in accordance with the deflection on the sensing tip by the tape. The preferred indicating means 25 is a self-contained unit having a power supply amplifier and a scale 26, as shown in FIG. 4, with a movable pointer 67 which gives the operator a reading in ounces and tenth of ounces of force. Good results have been obtained with a tension sensing transducer means 21 of the kind sold as model MTM-102 and with an indicating means 25 of the kind sold as a read-out amplifier model TM-106 both by Minnetech Labs, Inc. of Minneapolis, Minn. Other transducer means and indicating means may be used other than the above in accordance with the invention.

The pad deflector means 27 is positioned, as best seen in FIG. 4, immediately before the transducer sensing bar 51 to engage the pad 28 carried by the spring 29 in the cartridge housing to deflect the same inwardly and away from the tape 14. The pad is normally spring biased for cooperation with the sound transducer head. The deflector in this instance is a simple one piece deflector fastened to the support 12 with a forwardly extending neck 73 spaced above the support to permit a lower wall of the cartridge to be inserted into a space 74 between the support 12 and the neck 73 of the deflector. On the outer end of the neck of the deflector is an upstanding end 75 for abutting the pad 28 and deflecting the spring 29. The upper end of the upstanding end 75 of the deflector is disposed in a plane beneath the lower edge of the tape 14, as best seen in FIG. 4, and hence misses the tape while projecting inwardly of the tape into the interior of the cartridge to engage the lower margin of the pad 28. Stated differently, the lower margin of the pad 28 extends below the lower edge of the tape to engage the upstanding deflector end 75 when the cartridge is placed in position on the support 12. Preferably, the deflector is mounted and secured to the support 12 by a fastener 77, as best seen in FIG. 2, and it also is located at a precise position relative to the capstan 20 and side guides 33 and 34.

Figure 3:
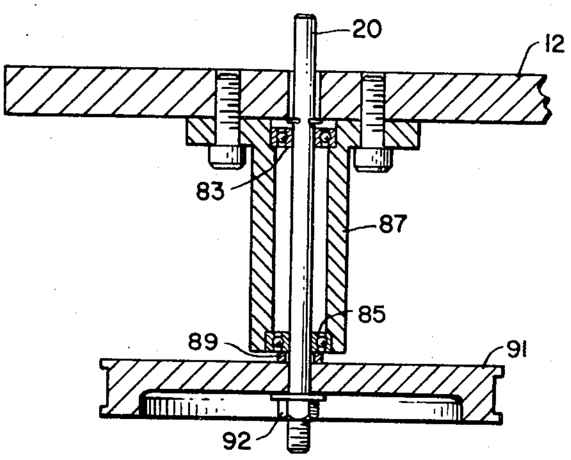
FIG. 3 is an enlarged cross-sectional view of a capstan for driving the tape.

The illustrated capstan 20 is substantially similar to that used in the tape transporting mechanism of a playback or recorder mechanism and includes an upper free end projecting above the support 12 for insertion into an opening 80 in the cartridge bottom wall 81 to engage the tape 14 at the pinch member 18. The capstan 20, as best seen in FIG. 3, is in the form of a circular shaft, a lower end of which projects downwardly through an opening in the support 12 and is journaled for rotation in an upper bearing 83 and a lower bearing 85 which are mounted at vertically spaced locations in a tubular bearing housing 87 fastened to the underside of the support 12. The lower end of the capstan extends through an annular collar spacer 89 and is fastened to a flywheel pulley 91 by the means of a nut 92. The flywheel pulley 91 serves to dampen any speed fluctuations and to provide a smooth and consistent rotational speed for the capstan to obtain a consistent transport speed of the magnetic tape 14.

The capstan 20 and the flywheel pulley 91 are driven by means of a drive belt 95 (FIG. 2) which extends to speed changing pulley assembly 97 which in turn is belt driven by a pulley secured to an output shaft 99 of a drive motor 100 mounted in a support bracket 101 fastened to the underside of the main support plate 12.

The illustrated motor and pulley assembly may be the same as those used in a commercially available eight track player so that the drive imparted to the tape is generally the same as that which will be experienced in an actual playback operation. In the illustrated apparatus, the motor 100 is an electric motor and is connected to an electrical power source. An on-off switch 105 may be used by the operator to turn off the motor 100 and thereby rotation of the capstan 20 between checking operations.

The illustrated side guides 33 and 34 for engaging opposite longitudinally extending side walls of the cartridge 15 are fastened to the support 12 at predetermined locations relative to the capstan 20 to define the means for locating the cartridge precisely in position relative to the transducer means 21. The illustrated side guide 33 is in the form of an elongated angle having a lower horizontally disposed flange 109 fastened by screws 111 to the support 12 with its upstanding flange 113 disposed to provide a first parallel guide wall of the cartridge 15. The opposite side guide 34 is adjustable and formed in two pieces. More specifically, the guide 34 includes first and second short angles spaced from each other and each having a lower flange 115 secured by fasteners 117 which have shanks extending through elongated slots 119 in their lower flanges. Upstanding flanges 121 on each of the angles are aligned to define a guide wall parallel to the flange 113 of the guide 33 to abut the cartridge at forward and rearward locations. The opening between the two spaced side guides allows the operator to grasp the cartridge side to facilitate removal thereof after the tape tension has been checked.

The illustrated means for urging the cartridge 15 to press the pinch member 18 and tape against the capstan 20 with 3 pounds of force comprises a pair of compression springs 123 abutted between an upward vertical side 125 of the spring mounting block 30 and a fixed mounting block 129. The springs 123 extend generally horizontally and encircle the shanks of screws 127. These screws 127 extend through and are guided for travel within horizontally disposed bores within the fixed mounting block 129. The spring block 30 is carried on ends of the screws which have threaded ends threaded into the spring block 30. At the opposite ends these screws have enlarged heads 131 which will abut the fixed block 129 to limit the amount of forward movement of the spring block 30 under the force of the springs 123 when no cartridge 15 is present. Preferably the fixed block 129 is fastened to be upstanding on the support 12 by means of screw fasteners 133 threaded into the support 12. The springs 123 each provide an equal pushing force and the screws 127 serve as guides for assuring the straight line forward movement of the spring block 30 and of the cartridge 15 to a position in which the pinch member 18 is pushing against the capstan 20 with 3 pounds of force.

Figure 5:
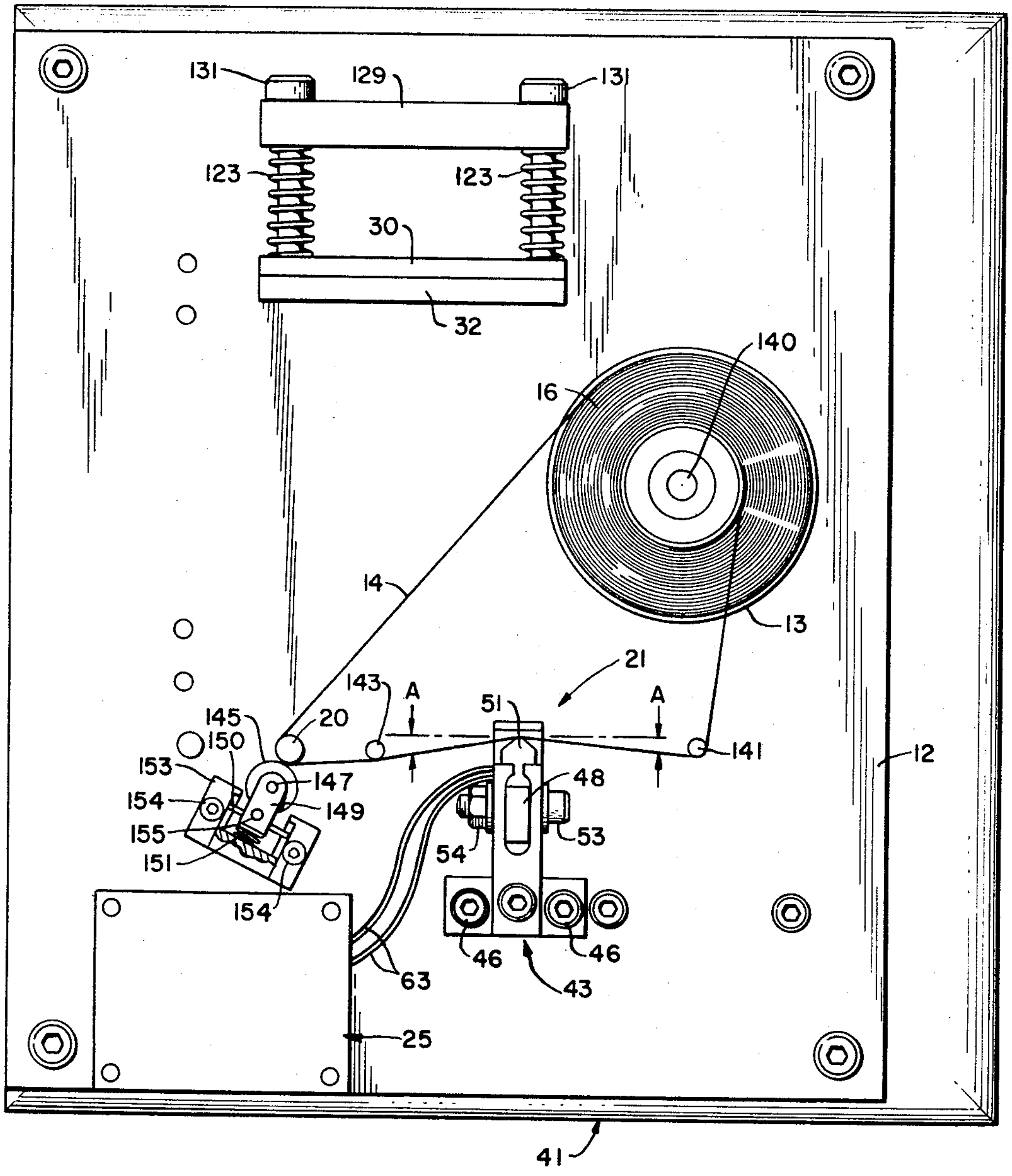
FIG. 5 illustrates the apparatus used to test the magnetic tape tension prior to the spool being disposed in a cartridge housing.

Should it be desired to measure the pullout force to turn the spool and unwind the magnetic tape 14 prior to placing the spool in the cartridge housing, the apparatus 11 may be used in a second mode with several modifications made thereto as will be described in connection with FIG. 5. The side guides 33 and 34 are removed from the upper plate by loosening the fasteners 111 and 117 to allow the spool 13 to be placed directly on an upstanding rotatable pin 140 which is mounted in the support 12 adjacent the position formerly occupied by the side guide 33. The rotatable pin 140 is journaled in bearings in the support 12 and projects into a hollow center in the spool to maintain the same at a fixed location for turning about a vertical axis through the pin 140.

A loop of tape is pulled from the spool and is brought forwardly to a rotatable guide post 141 on the support 12. From the post 141, the tape extends to a transducer head means 21 and then about the tip 51 of the transducer head means 21 to another rotatable guide post 143 journaled in and projecting upwardly from the support 12. In this instance, the guide posts are positioned relative to the transducer head tip that the tape travels to and from the tip at an angle A, for example, of 15° to assure the tape good contact with the tip 51 in order to deflect the transducer head for the measure of the tape pullout tension.

The means for urging the tape against the rotatable capstan 20 to establish the nip pressure includes a pinch member in the form of a rotatable pinch roller 145 carried on a vertical axle 147 which is mounted in a horizontally extending slide bracket 149. The slide bracket 149 is guided by a guide pin 150 inserted in a slot in the bracket and is urged by a spring 151 to apply 3 pounds of force against the pinch roller 145 and thereby against the tape 14 engaging the capstan 20. The guide pin 150 is secured in a mounting block 153 which is secured by fasteners 154 to the support 12.

The pinch roller 145 may be shifted from the operative position adjacent the capstan 20 to inoperative position position spaced from the capstan 20 to allow the insertion of tape into the nip between the capstan and the pinch roller. To this end, the slide bracket 149 carries an upwardly projecting pin 155 which the operator may grasp and push the slide bracket 149 to compress the spring 151 and move the pinch roller 145 from the tape 14. After the tape is inserted into the nip, the pin 155 may be released to re-establish the nip and the three pounds of force thereat.

When it is desired to use the transducer head means 21 with the cartridge 15, the screw type fasteners 154 are unthreaded from holes in the support 12 and the mounting block 153 is removed with the spring 151 and the pinch roller 145 therein. The side guides 33 and 34 may also be returned and fastened to the support 12.

As an aid to understanding the invention, a brief recapitulation of the operation of the illustrated apparatus 11 will be given. The front end of the cartridge 15 is inserted between the side guides 33 and 34 and slid forward toward the capstan 20 and the rearward end of cartridge is brought against inclined cam surface 32 on the spring urged block 30 and the rear end of the cartridge is pushed down to be flat on the support 12 causing the spring urged block 30 to be cammed rearwardly to admit the cartridge. With release of the cartridge, the block 30 urges the cartridge 15 forwardly with 3 pounds of force to establish the desired pressure between the pinch member 18, tape 14 and the capstan 20.

The operator will then operate the switch 105 to cause the electric motor 100 to turn the capstan 20 which then begins to feed the tape at the speed encountered in actual playback or recording operation, e.g., 3.75 ips. The operator will have already made sure that the tape deflector 27 has abutted the spring pad 28 and forced it rearwardly away from the tape 14 which is now in a direct engagement with the tip 51 of the force transducer means 21. The tension in the tape will force the transducer tip forwardly against the small very light spring force within the transducer causing a linear variable transformer to move and provide an output signal over lines 63 to the meter 25 which will then indicate to within one tenth of an ounce on the meter scale 26 the amount of tension present as the tape is fed. The operator may then visually read the tape tension and if it is within the tolerance range, the cartridge meets the generally accepted specifications. However, where the tension is not within the tolerance limits, the cartridge will have to be rejected. In any event, the operator will grasp the cartridge 15 and slide the same rearwardly away from the capstan 20 and the transducer head means 21 while lifting the cartridge from the support 12 to finish the operation.

Thus, it will be seen that magnetic tapes on tape spools 13 within or without cartridges 15 can be checked for tape pullout tension very quickly in an inexpensive manner. Rather than checking each cartridge or spool, systematic and periodic checks may be made, for example, one of every 50 cartridges of spools. This will enable the detection of any errors due to excessive winding or insufficient winding tension. By suitable splicing techniques, tape may be added or removed to change the length of the tape. The new length of tape then may be rewound to attempt to obtain proper tape tension for the coil on the spool.

From the foregoing it will be seen that a running tension check of magnetic tape in tape cartridges may be made quickly and inexpensively and in a manner substantially duplicating conditions actually encountered in actual use. The check is not a destructive one and the apparatus is simple and easy to operate and provides good results as to the tension present for the cartridge.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A combination comprising, a spool, a coil of endless magnetic tape carried on said spool for unwinding from an inner convolution of said coil and for returning to an outer convolution of said coil, support means for supporting the spool for rotation, a loop of tape extending from said inner convolution of said coil and returning to said outer convolution of said coil, a rotatable capstan for driving engagement with the loop of tape to pull and to unwind an inner convolution of the coil and to return tape to form an outer convolution for the tape coil, means for urging a portion of said loop of said tape against said capstan with a predetermined amount of force to cause with said capstan a couple to drive the tape, transducer means for engaging said loop of tape and for measuring the tension in said tape and an indicating means operable by said transducer means for indicating the amount of tension force on said tape while being transported.

2. An apparatus in accordance with claim 1 in which said means for urging said tape against said capstan comprises a biasing means engaging and urging the cartridge and a pinch member in said cartridge to abut the pinch member against the tape.

3. An apparatus in accordance with claim 1 in which said means for urging said tape against said capstan comprises a pinch member supported by said support means and movable from a position spaced from said tape and capstan into engagement with said tape, and a biasing means for urging said pinch member against said tape and toward said capstan.

4. A combination comprising, a magnetic tape cartridge, an endless magnetic tape in said cartridge, a spool means in said cartridge supporting a coil of said magnetic tape, a pinch member in said cartridge for engagement with said tape, means for supporting the spool for rotation, a rotatable capstan adjacent said supporting means for driving engagement with the tape to unwind an inner convolution of the coil and to return tape to form an outer convolution for the tape coil, means for urging said tape against said capstan with a predetermined amount of force to cause with said capstan a couple to drive the tape, transducer means for engaging said tape and for measuring the tension in said tape and an indicating means operable by said transducer means for indicating the amount of tension force on said tape while being transported.

5. An apparatus in accordance with claim 4 in which a pad deflecting means projects into an opening in said front wall of said cartridge and deflects a pad in said cartridge from pressing said tape against said transducer means.

6. An apparatus in accordance with claim 4 in which said means for establishing a predetermined pressure between said capstan and said pinch member in said cartridge comprises spring means pushing against the rear of said cartridge and pushing the same forwardly against said capstan, said capstan acting as a stop to limit forward sliding of said cartridge on said supporting means.

7. An apparatus in accordance with claim 6 in which side guides engage said cartridge side walls and guide the cartridge for straight line forward movement by said spring means.

8. An apparatus in accordance with claim 6 in which said spring means includes a spring urged block and at least one spring urging the block forward, said block being shiftable rearwardly to release a cartridge and for insertion of another cartridge.

9. An apparatus in accordance with claim 6 in which an adjustable support member carries said transducer means for positioning said transducer means at a predetermined position relative to said capstan so as to engage said tape at the proper location in the cartridge.

* * * * *

UNITED STATES PATENT OFFICE

CERTIFICATE OF CORRECTION

Patent No. 3,756,075 Dated September 4, 1973

Inventor(s) James E. Prader

It is certified that error appears in the above-identified patent and that said Letters Patent are hereby corrected as shown below:

Column 8, line 3, "An apparatus" should read --The combination--.
Column 8, line 8, "An apparatus" should read --The combination--.
Column 8, line 3, after "1" insert --including a magnetic tape cartridge and--.
Column 8, line 31, "An apparatus" should read --The combination--.
Column 8, line 32, "said" should read --a--.
Column 8, line 36, "An apparatus" should read --The combination--.
Column 8, line 44, "An apparatus" should read --The combination--.
Column 8, line 48, "An apparatus" should read --The combination--.
Column 8, line 53, "An apparatus" should read --The combination--.

Signed and sealed this 25th day of June 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.